United States Patent [19]
Patel et al.

[11] Patent Number: 5,513,369
[45] Date of Patent: Apr. 30, 1996

[54] STAR COUPLER DEVICE INCLUDING MEANS FOR CONNECTING MULTIPLE STAR COUPLERS TOGETHER IN A CASCADED RELATIONSHIP

[75] Inventors: Chiman R. Patel, Poway; Henry Y. Hsu, San Diego, both of Calif.

[73] Assignee: NCR Corporation, Dayton, Ohio

[21] Appl. No.: 740,542

[22] Filed: Aug. 5, 1991

[51] Int. Cl.[6] .................................................. G06F 13/00
[52] U.S. Cl. .............. 395/800; 395/200.16; 364/DIG. 1; 364/242.94; 364/238
[58] Field of Search .................................... 395/800, 200, 395/200.16; 385/24, 29; 370/85.13–85.16, 99.1; 350/96.16

[56] References Cited

U.S. PATENT DOCUMENTS

| | | | |
|---|---|---|---|
| 4,428,046 | 1/1984 | Chari et al. | 364/200 |
| 4,494,185 | 1/1985 | Gunderson et al. | 364/200 |
| 4,527,286 | 7/1985 | Haworth | 455/601 |
| 4,581,770 | 4/1986 | Haworth | 455/601 |
| 4,584,719 | 4/1986 | Miller | 455/608 |
| 4,630,254 | 12/1986 | Tseng | 370/60 |
| 4,700,344 | 10/1987 | Kaino et al. | 370/94 |
| 4,726,644 | 2/1988 | Mathis | 350/96.16 |
| 4,781,427 | 11/1988 | Husbands et al. | 350/96.16 |
| 4,826,275 | 5/1989 | Heinzman | 350/96.16 |
| 4,834,483 | 5/1989 | Arthurs et al. | 350/96.16 |
| 5,073,982 | 12/1991 | Viola et al. | 370/94.3 |
| 5,115,331 | 5/1992 | Gookin et al. | 359/117 |
| 5,140,655 | 8/1992 | Bergmann | 385/46 |
| 5,189,414 | 2/1993 | Tawara | 340/825.5 |

Primary Examiner—Mehmet B. Geckil
Attorney, Agent, or Firm—James M. Stover

[57] ABSTRACT

A star coupler device for interconnecting processors within a data processing system. The star coupler device includes first and second level star couplers. The first level star coupler includes a plurality of inputs and corresponding outputs and functions to logically OR together all signals received at its inputs to generate a first output signal. The second level star coupler also includes a plurality of inputs and corresponding outputs, one of the inputs to the second level star coupler being connected to receive the first output signal. The second level star coupler functions to logically OR together all signals received at its inputs, including the first output signal, to generate a second output signal which is provided at each of its outputs. A switch or multiplexer directs either the first or second output signal to each one of the outputs of the first level star coupler.

6 Claims, 2 Drawing Sheets

STAR COUPLER DEVICE INCLUDING MEANS FOR CONNECTING MULTIPLE STAR COUPLERS TOGETHER IN A CASCADED RELATIONSHIP

The present invention relates to data processing systems and, more particularly, to star couplers used to interconnect subsystems within a data processing system.

BACKGROUND OF THE INVENTION

Star couplers are well known in data processing technology. Systems employing star couplers or couplers similar to star couplers are described, for example, in "Data Processing System Having a Star Coupler with Contention Circuitry", Chari et al., U.S. Pat. No. 4,428,046, issued Jan. 24, 1984; "Data Processing System Employing Broadcast Packet Switching", Gunderson et al., U.S. Pat. No. 4,494,185, issued Jan. 15, 1985; and "Processor Overrun Circuit", Kaino et al., U.S. Pat. No. 4,700,344, issued Oct. 13, 1987.

The above listed patents, which are assigned to the Assignee of this invention, are incorporated herein by reference. The present invention is usable within the systems disclosed in the above-identified patents to interconnect processors within a subsystem, and further, to link subsystems together.

When used in a data processing system having a plurality of processors, a star coupler is typically connected to pairs of transmission lines, with one pair associated with each processor. A first transmission line of the pair carries signals away from the processor to the star coupler, and a second transmission line of the pair carries signals from the star coupler to the processor. When any processor transmits or generates a signal or message, that message is received by the star coupler from the first transmission line associated with the processor and is directed or passed to every processor by way of each second transmission line, including the second transmission line returning to the processor that transmitted the message. This of course offers advantages in linking multiple processors, since a processor transmitting a message receives back the message at the same time each of the other processors receives the message. The transmitting processor can therefore check for any transmission errors, without requiring a receiving subsystem to regenerate the message.

The function of the star coupler is essentially to take all the signals received on the input side of the coupler on the first transmission lines, logically OR all these first transmission line signals, and redrive the resulting signal to all processors over the second transmission line of each pair.

However, as the size of data processing systems increase and processing systems become more dispersed, a multitudinous number of cables are required to interconnect the greater number of processors. In large systems employing dozens of processors, cable congestion quickly becomes an unmanageable problem.

Fault detection is also difficult to implement in a distributed network. Systems employing a negative acknowledge protocol, where every processor on the network checks each transmission and has the ability to abort any transmission, a faulty transmission path could result in severely degraded bus performance. A method for quickly detecting and isolating faults in such a system is necessary in maintaining system performance and up time.

OBJECTS OF THE INVENTION

It is therefore an object of the present invention to provide a new and useful method for interconnecting processors within a distributed data processing system.

It is another object of the present invention to provide such a method which reduces cable congestion between components of the data processing system.

It is yet another object of the present invention to provide a new and useful star coupler device.

It is still a further object of the present invention to provide such a star coupler device for interconnecting processors within a distributed data processing system.

It is an additional object of the present invention to provide such a star coupler device including a first level star coupler for interconnecting processors within a subsystem and a second level star coupler for interconnecting a plurality of multiprocessor subsystems.

It is also an object of the present invention to provide a new and useful star coupler device including fault detection ability.

It is another object of the present invention to provide a new and useful star coupler device for use in within a distributed data processing system which provides flexibility in system connectivity and configurability.

SUMMARY OF THE INVENTION

There is provided, in accordance with the present invention, an integrated circuit device including first and second level star couplers. The first level star coupler includes a plurality of inputs and corresponding outputs and functions to logically OR together all signals received at its inputs to generate a first output signal. The second level star coupler also includes a plurality of inputs and corresponding outputs, one of the inputs to the second level star coupler being connected to receive the first output signal. The second level star coupler functions to logically OR together all signals received at its inputs, including the first output signal, to generate a second output signal which is provided at each of its outputs. A switch or multiplexer directs either the first or second output signal to each one of the outputs of the first level star coupler.

A data processing system is described wherein the above-described star coupler device is utilized to simplify the interconnection of a plurality of processors. The processors are grouped into several clusters or subsystems, each cluster or subsystem including a star coupler device and several processors. Within each subsystem, each included processor is connected by a pair of conductors to an input and corresponding output of the first level star coupler. Each subsystem is connected by a pair of conductors joining the subsystem's first level star coupler to a single one of the second level star couplers, which functions as the central connecting point for the data processing system.

The described embodiment also includes disconnect means for removing individual processors from the system and diagnostic structure which aids in the detection of faulty transmission paths within the system.

The above and other objects, features, and advantages of the present invention will become apparent from the following description and the attached drawings.

DETAILED DESCRIPTION OF THE PREFERRED EMBODIMENT

Figure 1:
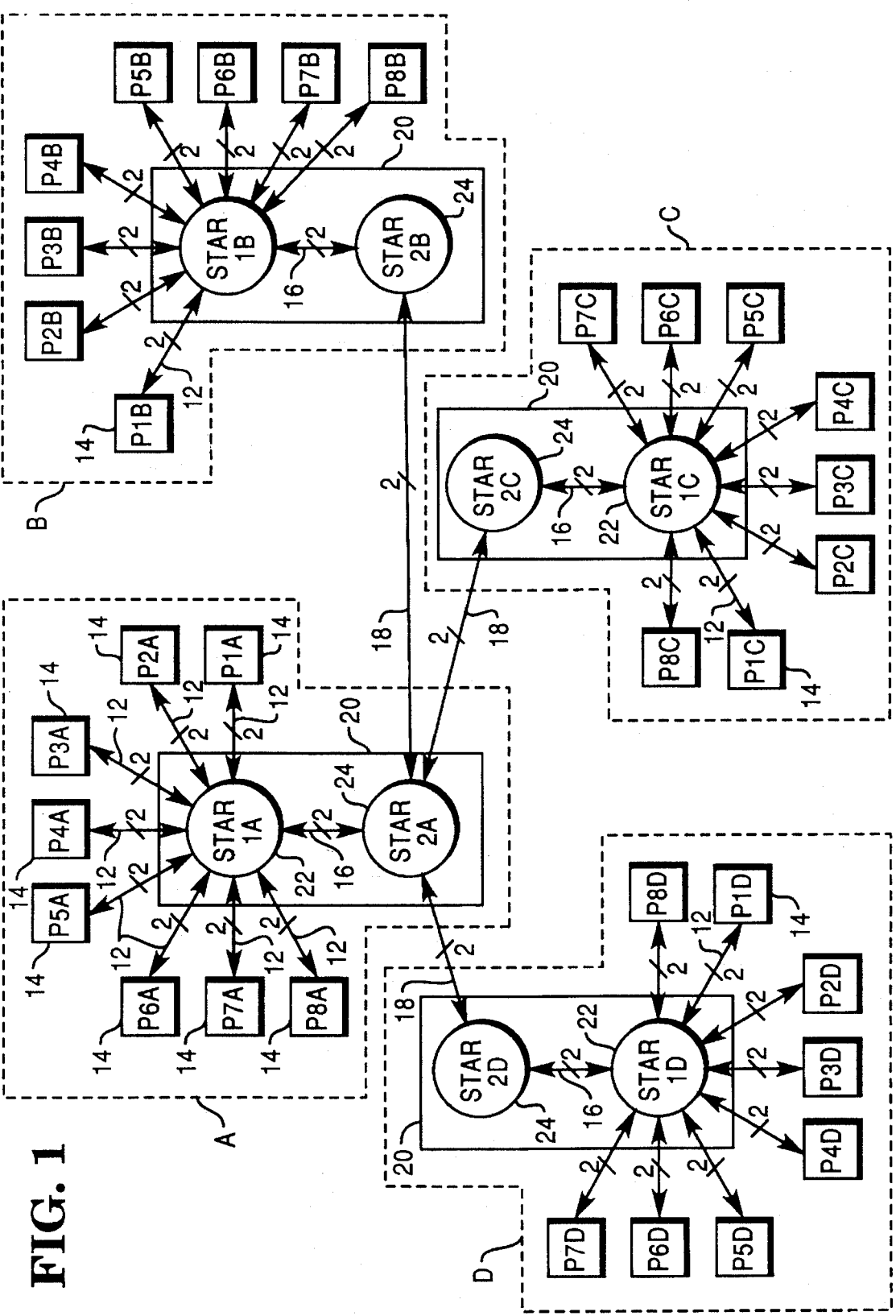
FIG. 1 is a simplified block diagram illustrating a data processing system having a plurality of subsystems including multiple processors, the subsystems and included processors linked together by pairs of star couplers in accordance with the present invention.

Referring now to FIG. 1, there is shown in general form a distributed data processing system including a plurality of subsystems identified by reference numerals A through D. The subsystems are each enclosed within broken lines in the drawing to indicate their physical enclosure within a cabinet. Each subsystem includes a plurality of processors 14, each of which is linked to a star coupler device 20 by a cables 12. Cables 18 interconnect the star coupler devices of each subsystem.

Each star coupler device 20 includes two star couplers 22 and 24, the construction and operation of which will be described in greater detail below. Star coupler 22 is connected via cables 12 with processors 14. Each cable includes a pair of conductors, one of which is connected to carry messages from the associated processor to the star coupler, while the second conductor conducts messages from the star coupler device to its associated processor. Within each subsystem, star coupler 22 operates in a conventional manner such that any message that is received by star coupler 22 from a linked processor 14 via cables 12 will be retransmitted to each of the linked processors, including the processor that generated the message.

Star couplers 24, also identified as STAR 1A, STAR 1B, STAR 1C and STAR 1D in FIG. 1, cable pairs 12 and connected processors 14 form the lower tier of a two level communication network, the upper tier of the hierarchy being comprised of star couplers 24, alternatively identified as STAR 2A, STAR 2B, STAR 2C and STAR 2D, and cables 18.

One of the star couplers, i.e. STAR 2A in FIG. 1, is selected as the central connecting point for cables 18. STAR 2A is connected through a pair of conductors 16 to STAR 1A and via cables 18, each including a pair of conductors, to each one of star couplers STAR 1B, STAR 1C and STAR 1D. Star couplers 22 are connected by one of the pair of conductors to provide messages to star coupler STAR 2A, and by the second conductor to receive messages from star coupler STAR 2A. Star couplers STAR 2B, STAR 2C and STAR 2D are not utilized in the system as configured in FIG. 1.

Each one of star couplers 22 ORs together all signals received from processors 14 contained within the associated cluster or subsystem, and passes the composite signal to star coupler STAR 2A where the signals from each cluster are ORed together. The output signal generated by STAR 2A is returned to each one of star couplers 22 and processors 14.

Figure 2:
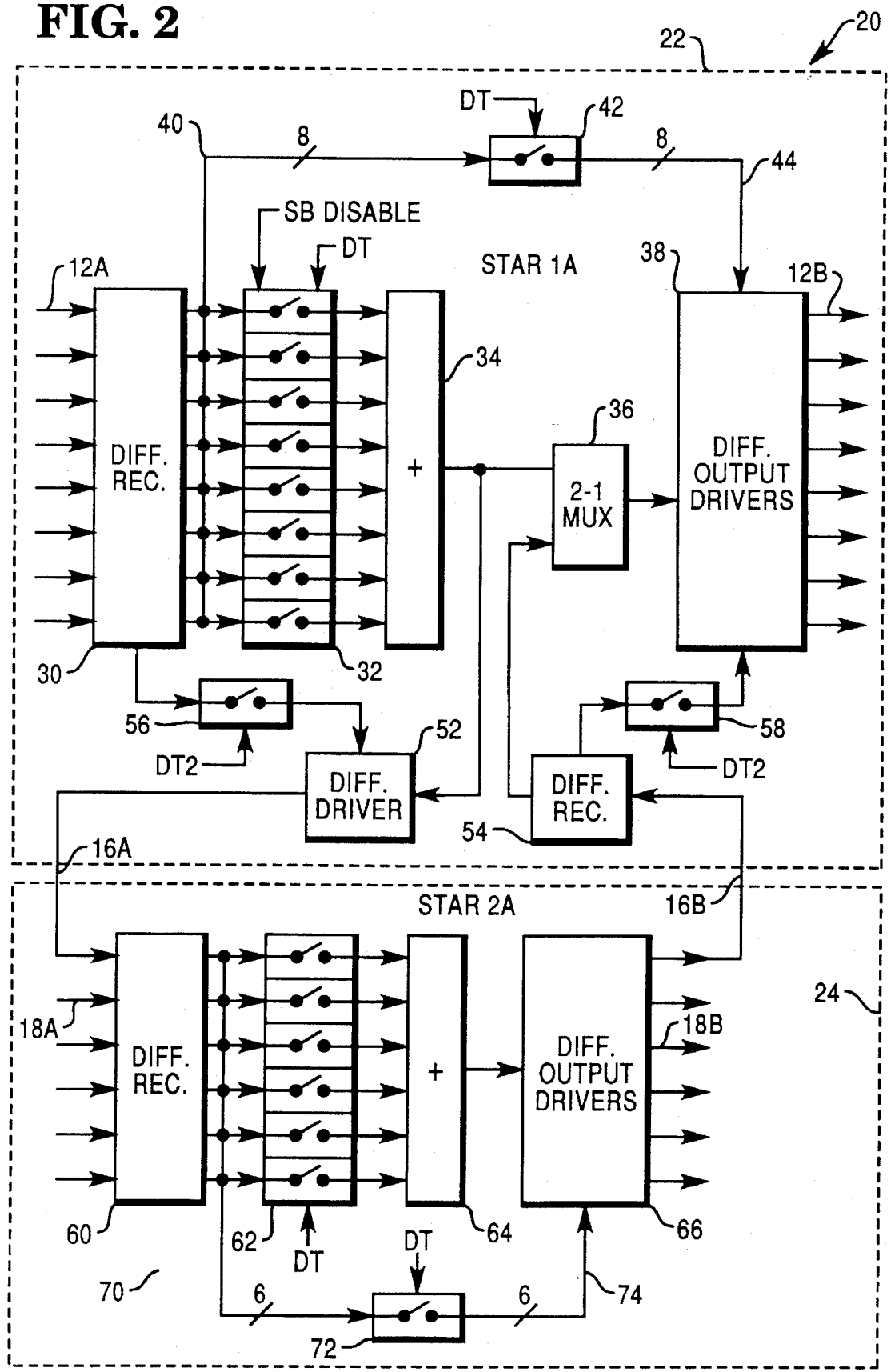
FIG. 2 is a block diagram illustrating the components within each star coupler pair shown in FIG. 1.

The construction of the star coupler device of subsystem A is illustrated in block diagram form in FIG. 2. As described above, each star coupler device 20 includes two star couplers 22 and 24. Star coupler 22 of subsystem A, also identified as STAR 1A, comprises a differential receiver 30 having eight receivers connected to receive messages via cables 12A. The messages received by receiver 30 via cables 12A are provided from receiver 30 through a bank of switches 32 to an OR circuit 34. The single output of OR circuit 34 is connected to one input of a 2:1 multiplexer 36, the output of which is provided to a differential output driver 38. Output driver 38 provides the message received from multiplexer 36 to each one of up to eight output cables 12B. Cables 12A are paired with cables 12B to form cable pairs 12.

Star coupler 24, also designated as STAR 2A, includes a differential receiver 60 having six inputs identified by reference numerals 16A and 18A and six corresponding outputs, a bank of switches 62 connected between the outputs of receiver 60 and an OR circuit 64, and a differential output driver 66 which provides the output of OR gate 64 to each one of up to six output conductors labeled 16B and 18B. Conductors 18A together with conductors 18B form cables 18.

Connection between star couplers STAR 1A and STAR 2A is provided by conductors 16A and 16B. Conductor 16A provides the message generated by OR circuit 34 to receiver 60 while conductor 16B connects one output of output driver 66 to the second input of multiplexer 36. Included within STAR 1A is a differential output driver 52 interposed between the output of OR circuit 34 and conductor 16A and a differential receiver 54 positioned between conductor 16B and multiplexer 36.

The star coupler devices of subsystems B through D of FIG. 1 are also constructed as described above.

Star coupler device 20 is operable in either of two modes depending upon the enablement of multiplexer 36, which selectively directs either the output of OR circuit 34 or the output of star coupler 24 to output driver 38. When multiplexer 36 is enabled to couple the output of OR circuit 34 into output driver 38 star coupler device 20 operates as a conventional star coupler, combining the signals received by differential receiver 30 into a single signal which is provided back to each signal source as described previously. No function is performed by star coupler 24 during this mode of operation.

In accordance with the second mode of operation, multiplexer 36 is set to provide the output of star coupler 24 to output driver 38. The output of OR circuit 34 is provided via conductor 16A to receiver 60 where it is combined with signals received from other subsystems via conductors 18A. The signal conducted along conductor 16A is an OR-ed combination of signals obtained from processors linked to star coupler 22 while the signals transmitted by conductors 18A are each an OR-ed combination of local processor signals obtained from a star coupler associated with another subsystem. Each of the star coupler device 20s of FIG. 1 are configured in the manner just described.

In FIG. 1, star coupler STAR 2A operates as the central connecting point for subsystems A through D, connecting with star coupler STAR 1A via conductor pair 16. Cables 18 connect star coupler STAR 2A to each one of star couplers STAR 2B, STAR 2C and STAR 2D. Within each one of star couplers STAR 2B, STAR 2C and STAR 2D the corresponding cable 18 is connected to receiver 60 and output driver 66.

Diagnostic ability is provided by including disconnect switches and diagnostic turnaround paths within star couplers 22 and 24. Referring to FIG. 2, the disconnect and diagnostic structure incorporated within star coupler 22 includes an eight-bit wide bus 40, a bus switch 42 and a second eight-bit bus 44 connected in series between receiver 30 and output driver 38. Incorporated within star coupler 24 are a six-bit wide bus 70, a bus switch 72 and a second six-bit wide bus 74 connected in series between receiver 60 and output driver 66. The disconnect and diagnostic structure further includes switch banks 32 and 62, a switch 56 connected between receiver 30 and output driver 52, and a switch connected between receiver 66 and output driver 38.

The disconnect feature allows one of processors 14 to be removed from the system without removing cables or interrupting system operation. Switch bank 32 provides the means for disconnecting selected processors. Any one or more of the eight switches included in bank 32 may be opened to disconnect corresponding processors. Disconnected processors remain connected to receive messages placed upon the system bus by other processors as connections between output driver 38 and the individual processors are not affected by the operation of switch bank 32. The disconnect function may be beneficially utilized during routine processor maintenance or to prevent corruption of system elements due to a malfunctioning processor. Switch bank 62 can be utilized to isolate a selected subsystem from the system.

Diagnostic turnaround can be performed within either of star couplers 22 or 24. The star coupler 22 diagnostic function allows a processor to perform self diagnostics on its subsystem bus connections by feeding the signal from a star coupler 22 input directly to its corresponding output. To perform the diagnostic turnaround function at the star coupler 22 level, switch bank 32 is configured in response to a diagnostic turnaround signal DT to isolate the processor under test. Bus switch 42 is closed, also in response to signal DT, to connect bus 40 to bus 44. Eight bit bus 40 connects with receiver 30 to receive the eight input signals provided thereto, while bus 44 connects into output driver 38 where the input signals are gated to the corresponding output lines. Any number of processors can be configured for diagnostic turnaround at any one time. The turnaround function removes the processors under test from the system bus. All other processors continue normal communication with the system.

Although bus switch 42 is shown as a single switch, it is actually eight switches similar so switch bank 32. The eight switches can be openned or closed individually in response to eight separate DT signals.

The star coupler 24 diagnostic function allows a processor within a subsystem containing a second level star coupler to check the integrity of its transmission paths through both star couplers 22 and 24. To perform the diagnostic turnaround function at the star coupler 24 level, switches 56 and 58 are closed to provide diagnostic transmission path between the first and second level star couplers. Switch bank 62 is configured to isolate the first level star coupler from the remainder of the system. Bus switch 72, which is comprised of six individual switches, is closed to provide the input signals received by receiver 60 to the corresponding outputs of output driver 66. Note that during diagnostic testing of the second level star coupler, the entire subsystem associated with the second level star coupler is disconnected from the system.

To maintain small pulsewidth distortion tolerances, star coupler devices 20 are implemented in Application Specific Integrated Circuit (ASIC) technology. All of the star coupler device circuitry is contained in one ECL macrocell array which alleviates the problem of wide varying component parameters causing signal distortion. The tightly controlled ASIC environment reduces pulsewidth distortion on input signals allowing implementation of deeper levels of gating and eliminating the need for on-site system bus tuning.

It can thus be seen that there has been provided by the present invention a new and useful star coupler device which simplifies interconnection between plurality of processors within a distributed data processing system. Use of the above-described star coupler device within a data processing system greatly reduces cable congestion, enhances fault detection ability, yields flexibility in connectivity and provides minimal pulsewidth distortion.

Although the presently preferred embodiment of the invention has been described, it will be understood that various changes may be made within the scope of the appended claims. For example, in FIG. 1, cables 18 connected star couplers STAR 2B, STAR 2C and STAR 2D with coupler STAR 2A. However, connections to subsystems B, C and D could be made directly between STAR 2A and processor ports of star couplers STAR 1B, STAR 1C and STAR 1D. STAR 2B, STAR 3B and STAR 4B would not be utilized in this configuration.

What is claimed is:

1. An integrated circuit device, comprising:

a first level star coupler having a plurality of input ports, said first level star coupler for combining a first plurality of input signals received at said input ports into a first output signal; and a second level star coupler having a plurality of input ports, one of its input ports being connected to receive said first output signal, said second level star coupler for combining said first output signal with a second plurality of input signals received at said second star coupler's input ports to generate a second output signal, and a multiplexer having a first input port connected to receive said first output signal and a second input port connected to receive said second output signal, said multiplexer providing an output signal which can be selected to be either said first output signal or said second output signal.

2. The device according to claim 1, wherein:

said first level star coupler includes a first OR gate connected to said first level star coupler's input ports to receive said first plurality of input signals, said first OR gate providing said first output signal; and said second level star coupler includes a second OR gate connected to receive said first output signal and connected to said second star coupler's input ports to receive said second plurality of input signals, said second OR gate providing said second output signal.

3. The device according to claim 1 wherein:

said first level star coupler further includes a first output driver circuit having an input port connected to receive the output signal from said multiplexer and a plurality of output ports, each of said first output driver circuit's output ports providing an output signal equivalent to the output signal received from said multiplexer; and said second level star coupler further includes second output driver circuit having an input port connected to receive said second output signal and a plurality of output ports, each of said second output driver circuit's output ports providing an output signal equivalent to said second output signal, one of said second output driver circuit's output ports being connected to the second input of said multiplexer.

4. The device according to claim 3, wherein:

said first output driver circuit includes an output port corresponding to each one of said first level star coupler input ports, each of said output ports providing the output signal from said multiplexer;

said first level star coupler includes switch means connected between each one of the said first level star coupler's input ports and its corresponding output port;

said second output driver circuit includes an output port corresponding to each one of said second level star coupler's input ports; and said second level star coupler includes switch means connected between each one of said second level star coupler's input ports and its corresponding output port.

5. The device according to claim 1, further comprising:

switch means integrated into each input port of said first level star coupler for blocking receipt of selected input signals by said first level star coupler; and switch means integrated into each input port of said second level star coupler for blocking receipt of selected input signals by said second level star coupler.

6. A data processing system, comprising:

a plurality of first level star couplers, each of said first level star couplers having a plurality of input and output ports, each one of said first level star couplers including:
- a first OR gate connected to receive a first plurality of input signals from its associated processors for combining said received input signals to generate a first output signal;
- a multiplexer having first and second inputs, said first input being connected to receive said first output signal, said second input being connected to receive a second output signal, said multiplexer providing an output signal which can be selected to be either said first output signal or said second output signal; and
- a first output driver circuit having an input port connected to receive the output of said multiplexer and a plurality of output ports forming the output ports of said first level star coupler, each of said first star coupler's output ports providing an output signal equivalent to the output signal received from said multiplexer;

a plurality of processors associated with each one of said first level star couplers, each one of said processors being connected to a corresponding input port and a corresponding output port of its associated first level star coupler; and a second level star coupler having a plurality of input and output ports, wherein an output port of each one of said first level star couplers is connected to a corresponding input port of a said second level star coupler, and wherein an input port of each one of said first level star couplers is connected to a corresponding output port of said second level star coupler, said second level star coupler including:
- a second OR gate connected to receive the first output signals from said each of said first level star couplers for combining said received first output signals to generate said second output signal; and
- a second output driver circuit having an input port connected to receive said second output signal and a plurality of output ports forming the output ports of said second level star coupler, one of the output ports of said second output driver being connected to provide said second output signal to the second input of said multiplexer.

* * * * *